US012674882B2

(12) United States Patent
Jeon et al.

(10) Patent No.: US 12,674,882 B2
(45) Date of Patent: Jul. 7, 2026

(54) ELECTRONIC DEVICE FOR PERFORMING RANGING THROUGH UWB, AND OPERATION METHOD OF ELECTRONIC DEVICE

(71) Applicants: Samsung Electronics Co., Ltd., Gyeonggi-do (KR); Seoul National University R&DB Foundation, Seoul (KR)

(72) Inventors: Whasook Jeon, Seoul (KR); Hyunseob Oh, Seoul (KR); Woongsup Song, Seoul (KR)

(73) Assignees: Samsung Electronics Co., Ltd (KR); Seoul National University R&DB Foundation (KR)

( * ) Notice: Subject to any disclaimer, the term of this patent is extended or adjusted under 35 U.S.C. 154(b) by 408 days.

(21) Appl. No.: 17/918,488

(22) PCT Filed: Mar. 30, 2021

(86) PCT No.: PCT/KR2021/003943
§ 371 (c)(1),
(2) Date: Oct. 12, 2022

(87) PCT Pub. No.: WO2021/215686
PCT Pub. Date: Oct. 28, 2021

(65) Prior Publication Data
US 2023/0141919 A1 May 11, 2023

(30) Foreign Application Priority Data
Apr. 22, 2020 (KR) ........................ 10-2020-0048859

(51) Int. Cl.
*G01S 13/76* (2006.01)
(52) U.S. Cl.
CPC ................................. *G01S 13/765* (2013.01)

(58) Field of Classification Search
CPC .. G01S 13/765; G01S 13/0209; G01S 13/767; G01S 13/88; G01S 13/103;
(Continued)

(56) References Cited

U.S. PATENT DOCUMENTS 5,196,856 A * 3/1993 Litchford ................ G01S 13/76
342/455
6,754,225 B1 * 6/2004 Lin ..................... H04L 12/2801
370/461
(Continued)

FOREIGN PATENT DOCUMENTS

KR     1020100050809      5/2010
KR       10-1571736      11/2015
(Continued)

OTHER PUBLICATIONS

P802.15.4zâ¢/07 Draft Standard for Low-Rate Wireless Networks Amendment: Enhanced Ultra Wideband (UWB) Physical Layers (PHYs) and Associated Ranging Techniques by IEEE (Year: 2020).*
(Continued)

*Primary Examiner* — Michael W Justice
(74) *Attorney, Agent, or Firm* — The Farrell Law Firm, P.C.

(57) ABSTRACT

The present disclosure relates to an electronic device for performing ranging by using an ultra-wideband (UWB) communication method, and an operation method of the electronic device. According to an embodiment, an operation method of a first electronic device may include: transmitting, by the first electronic device, a first ranging control message (RCM) including information for controlling a ranging procedure of a ranging group, the first RCM including time information configured for receiving a ranging request from a device not participating in the ranging group; receiving a ranging request from a second electronic device based on the time information; transmitting a second RCM
(Continued)

including information about a slot allocated to the second electronic device; and performing ranging with the second electronic device based on the second RCM.

5 Claims, 20 Drawing Sheets

(58) Field of Classification Search
CPC ... G01S 5/0284; H04W 64/00; H04W 64/003; H04W 4/80; H04W 4/70; H04W 8/005
USPC .......................................................... 342/125
See application file for complete search history.

(56) References Cited

U.S. PATENT DOCUMENTS

| | | | | |
|---|---|---|---|---|
| 6,876,326 | B2 * | 4/2005 | Martorana .............. | G01S 1/022 |
| | | | | 342/463 |
| 6,882,851 | B2 * | 4/2005 | Sugar .................... | H04W 72/20 |
| | | | | 455/454 |
| 7,877,093 | B2 * | 1/2011 | Lee ................... | H04W 36/0058 |
| | | | | 455/435.2 |
| 8,112,088 | B2 * | 2/2012 | Lee ..................... | H04W 36/302 |
| | | | | 370/332 |
| 8,126,462 | B2 * | 2/2012 | Thakare ................ | H04W 36/08 |
| | | | | 370/335 |
| 8,374,611 | B2 * | 2/2013 | Lee .................... | H04W 36/302 |
| | | | | 455/418 |
| 8,462,726 | B2 * | 6/2013 | Park ................. | H04W 56/0005 |
| | | | | 370/208 |
| 8,498,282 | B2 * | 7/2013 | Doi ....................... | H04W 74/04 |
| | | | | 370/310 |
| 8,600,420 | B2 * | 12/2013 | Lee .................... | H04L 27/2655 |
| | | | | 455/450 |
| 9,197,997 | B2 * | 11/2015 | Park ..................... | H04W 68/00 |
| 9,390,302 | B2 * | 7/2016 | Bassan-Eskenazi ......................... | |
| | | | | G01S 13/767 |
| 9,419,755 | B2 * | 8/2016 | Son ....................... | H04L 1/1657 |
| 9,519,812 | B2 * | 12/2016 | Bassan-Eskenazi ......................... | |
| | | | | G06K 7/0008 |
| 10,034,188 | B2 * | 7/2018 | Ben-Haim ............ | H04L 43/106 |
| 10,264,544 | B1 * | 4/2019 | Chu ..................... | H04L 5/0048 |
| 10,285,152 | B2 | 5/2019 | Park et al. | |
| 10,411,778 | B1 * | 9/2019 | Ho ....................... | H04B 7/0682 |
| 10,486,646 | B2 * | 11/2019 | Ledvina ................ | H04W 12/50 |
| 10,568,057 | B2 * | 2/2020 | Chae .................... | H04W 56/00 |
| 10,641,887 | B1 * | 5/2020 | Chu ..................... | G01S 13/765 |
| 10,769,562 | B2 * | 9/2020 | Morgenthau ......... | G08B 21/043 |
| 10,813,170 | B2 * | 10/2020 | Xue ....................... | H04W 88/08 |
| 10,826,587 | B2 * | 11/2020 | Ho ........................ | H04W 76/10 |
| 10,880,860 | B2 * | 12/2020 | Park ..................... | H04W 24/10 |
| 11,170,616 | B2 * | 11/2021 | Morgenthau ............ | G08B 7/06 |
| 11,191,042 | B2 * | 11/2021 | Qi ........................ | H04W 4/021 |
| 11,382,056 | B2 * | 7/2022 | Wang ................. | H04W 72/046 |
| 2002/0155845 | A1 * | 10/2002 | Martorana ............ | H04W 64/00 |
| | | | | 455/456.1 |
| 2003/0181213 | A1 * | 9/2003 | Sugar .................... | H04W 72/20 |
| | | | | 455/454 |
| 2005/0041573 | A1 * | 2/2005 | Eom ................. | H04W 74/0866 |
| | | | | 370/208 |
| 2005/0058058 | A1 * | 3/2005 | Cho .................... | H04W 74/002 |
| | | | | 370/208 |
| 2005/0059437 | A1 * | 3/2005 | Son ................. | H04W 52/0245 |
| | | | | 455/574 |
| 2005/0096051 | A1 * | 5/2005 | Lee .................... | H04W 36/302 |
| | | | | 455/438 |
| 2005/0195791 | A1 * | 9/2005 | Sung .................... | H04L 5/0048 |
| | | | | 370/335 |

| | | | | |
|---|---|---|---|---|
| 2008/0305804 | A1 * | 12/2008 | Lee ..................... | H04L 27/2655 |
| | | | | 455/446 |
| 2009/0080660 | A1 * | 3/2009 | Mo ........................ | H04L 63/162 |
| | | | | 380/279 |
| 2009/0111470 | A1 * | 4/2009 | Thakare ............ | H04W 36/0064 |
| | | | | 455/436 |
| 2009/0125959 | A1 * | 5/2009 | Oh ...................... | H04N 21/6118 |
| | | | | 725/111 |
| 2009/0201874 | A1 * | 8/2009 | Okuda .................. | H04W 72/23 |
| | | | | 370/329 |
| 2010/0002676 | A1 * | 1/2010 | Doi ........................ | H04W 74/04 |
| | | | | 370/345 |
| 2010/0029279 | A1 * | 2/2010 | Lee ........................ | H04W 36/08 |
| | | | | 455/438 |
| 2010/0109943 | A1 * | 5/2010 | Park ........................ | G01S 19/25 |
| | | | | 342/357.42 |
| 2010/0157933 | A1 * | 6/2010 | Park .................. | H04W 56/0005 |
| | | | | 370/336 |
| 2011/0286409 | A1 * | 11/2011 | Son ........................ | H04L 1/0061 |
| | | | | 370/329 |
| 2012/0094711 | A1 * | 4/2012 | Lee ....................... | H04W 36/08 |
| | | | | 455/525 |
| 2012/0314639 | A1 * | 12/2012 | Shiotani ................ | H04W 72/27 |
| | | | | 370/345 |
| 2014/0148196 | A1 * | 5/2014 | Bassan-Eskenazi ........................ | |
| | | | | H04W 4/029 |
| | | | | 455/456.1 |
| 2014/0148199 | A1 * | 5/2014 | Park ....................... | H04W 4/023 |
| | | | | 455/456.2 |
| 2017/0245119 | A1 * | 8/2017 | Huang .................. | H04L 12/189 |
| 2018/0098299 | A1 * | 4/2018 | Chae ......................... | H04J 11/00 |
| 2018/0121861 | A1 * | 5/2018 | Morgenthau ... | G06Q 10/063114 |
| 2018/0139476 | A1 * | 5/2018 | Deshpande .......... | H04N 21/435 |
| 2018/0151037 | A1 * | 5/2018 | Morgenthau ......... | G08B 25/016 |
| 2019/0135229 | A1 * | 5/2019 | Ledvina ................ | H04W 12/50 |
| 2019/0208387 | A1 * | 7/2019 | Jiang ...................... | H04W 4/46 |
| 2019/0268051 | A1 * | 8/2019 | Ho ........................ | H04B 7/0632 |
| 2020/0007212 | A1 * | 1/2020 | Ho ........................ | H04B 7/0682 |
| 2020/0256975 | A1 * | 8/2020 | Chu ...................... | G01S 13/765 |
| 2021/0058881 | A1 * | 2/2021 | Wang .................. | H04W 64/006 |

FOREIGN PATENT DOCUMENTS

| | | |
|---|---|---|
| KR | 1020160046801 | 4/2016 |
| KR | 1020170054862 | 5/2017 |
| KR | 1020180061078 | 6/2018 |
| KR | 1020190092548 | 8/2019 |
| KR | 10-2055085 | 12/2019 |

OTHER PUBLICATIONS

P802.15.4z/D01, Draft Standard for Low-Rate Wireless Networks, Amendment: Enhanced Ultra Wide-Band (UWB) Physical Layers (PHYs) and Associated Ranging Techniques, Apr. 2019, 143 pages.
International Search Report dated Jul. 12, 2021 issued in counterpart application No. PCT/KR2021/003943, 16 pages.
Jack Lee et al., "IEEE 802.15.4z MAC for Ranging", Dec. 2018, <15-18-0621-00-004z>, 67 pages.
Korean Office Action dated Feb. 3, 2025 issued in counterpart application No. 10-2020-0048859, 10 pages.
LAN/MAN Standards Committee, P802.15.4z/D07, Draft Standard for Low-Rate Wireless Networks, Amendment: Enhanced Ultra Wideband (UWB) Physical Layers (PHYs) and Associated Ranging Techniques, Mar. 2020, 191 pages.
Korean Office Action dated Sep. 3, 2025 issued in counterpart application No. 10-2020-0048859, 11 pages.

* cited by examiner

FIG. 5

RCAP OR RCFP

| RBS #0 | | | | | ... | | | RBS #n | | | | |
|---|---|---|---|---|---|---|---|---|---|---|---|---|
| RSTU #0 | RSTU #1 | ... | RSTU #m | | RSTU #0 | RSTU #1 | ... | RSTU #m | | RSTU #0 | RSTU #1 | ... | RSTU #m |

RANGING SLOT TIME UNIT

| Octets: 2 | 2/4 | 2/4 | 1 | Variable |
|---|---|---|---|---|
| Slot size multiplier for RBS | Beacon interval | First RCM slot | RM table length | RM table |

602

| Bits: 10 | 10 | 1 | 3 |
|---|---|---|---|
| Starting RBS number | Ending RBS slot number | RCAP/RCFP indicator | Reserved |

| Bits: 1 | 1 |
|---------|---|
| RRF indicator | ACK field value |

702

| ACK field value | meaning |
|-----------------|---------|
| 0 | RANGING REQUEST REJECTED |
| 1 | RANGING REQUEST ACCEPTED |

FIG.  10

| Octets: 0/2 | 0/1 | 0/2 | 2 | 2 |
|---|---|---|---|---|
| Ranging block index | Hopping mode | Round index | Transmission offset | Transmission offset for RRF |

| Bits: 1 | 7 | Variable |
|---|---|---|
| SIP | RDM table length | RDM table |

1202

| Bits: 1 | 7 | Octets: 2/8 |
|---|---|---|
| Device Type | Slot index/Reserved | Address |

FIG. 14

| Device Type | Slot index | Address |
|---|---|---|
| – | 3 | 0xFFFF |
| – | 6 | 0xFFFF |
| | | |
| | | |

FIG. 15

| Device Type | Slot index | Address |
|---|---|---|
| Initiator | 1 | 0x1234 |
| Responder | 2 | 0x42AD |
| – | 3 | 0xFFFF |
| – | 6 | 0xFFFF |

ELECTRONIC DEVICE FOR PERFORMING RANGING THROUGH UWB, AND OPERATION METHOD OF ELECTRONIC DEVICE

PRIORITY

This application is a National Phase Entry of PCT International Application No. PCT/KR2021/003943, which was filed on Mar. 30, 2021, and claims priority to Korean Patent Application No. 10-2020-0048859, which was filed on Apr. 22, 2020, the entire content of each of which is incorporated herein by reference.

TECHNICAL FIELD

The present disclosure relates to an electronic device capable of performing ranging by using an ultra-wideband (UWB) communication method, and an operation method of the electronic device.

BACKGROUND ART

The Internet has evolved from a human-centered connection network, through which humans generate and consume information, to an Internet-of-Things (IoT) network that exchanges and processes information between distributed elements such as objects. Internet-of-Everything (IoE) technology in which a big data processing technology via a connection with a cloud server or the like is combined with the IoT technology has also emerged. In order to implement IoT, technical factors, such as sensing technology, wired/wireless communication, network infrastructure, service-interface technology, or security technology, are required. Research on technologies for connection between objects, such as sensor network, machine-to-machine (M2M) communication, or machine-type communication (MTC), has recently been conducted.

In an IoT environment, via collection and analysis of data generated from connected objects, an intelligent internet technology (IT) service to create new value for peoples' lives may be provided. IoT may be applied to various fields, such as smart homes, smart buildings, smart cities, smart cars or connected cars, smart grids, health care, smart home appliances, or high-tech medical services, via the convergence and combination of existing information technology (IT) and various industries.

With the development of wireless communication systems, it is possible to provide various services, for which there is a need for a method for effectively providing the services. For example, in medium access control (MAC), a ranging technique for measuring a distance between electronic devices by using ultra-wideband (UWB) may be used. UWB is a wireless communication technology that uses an ultra-wide frequency band of several GHz or greater in a baseband, without using a radio carrier. For example, a UWB ranging technique may be used for a system for tracking the locations of human staff or products in a factory or an office.

DESCRIPTION OF EMBODIMENTS

Technical Problem

In order to utilize ultra-wideband (UWB) ranging in a system for tracking the locations of human staff or products, a procedure in which a device, the location of which is to be measured, participates in a ranging group for performing ranging between a plurality of devices may be required.

Solution to Problem

According to an embodiment of the present disclosure, an operation method of a first electronic device may include: transmitting, by the first electronic device, a first ranging control message (RCM) including information for controlling a ranging procedure of a ranging group, the first RCM including time information configured for receiving a ranging request from a device not participating in the ranging group; receiving a ranging request from a second electronic device based on the time information; transmitting a second RCM including information about a slot allocated to the second electronic device; and performing ranging with the second electronic device based on the second RCM.

BRIEF DESCRIPTION OF DRAWINGS

FIG. 5 illustrates a time structure of a ranging contention access period (RCAP) or a ranging contention free period (RCFP).

FIG. 6 illustrates a format of a ranging descriptor (RD) information element (IE).

FIG. 7 illustrates a format of an acknowledgement (ACK) IE.

FIG. 10 illustrates a format of a ranging round (RR) IE modified according to an embodiment.

FIG. 12 illustrates a format of a ranging device management (RDM) IE according to an embodiment.

FIG. 14 illustrates an example of an RDM IE including information about slots designated to receive a ranging request, according to an embodiment.

FIG. 15 illustrates an example of an RDM IE including slots allocated to electronic devices from which ranging requests are received, and the addresses of the electronic devices, according to an embodiment.

BEST MODE

Figure 1:
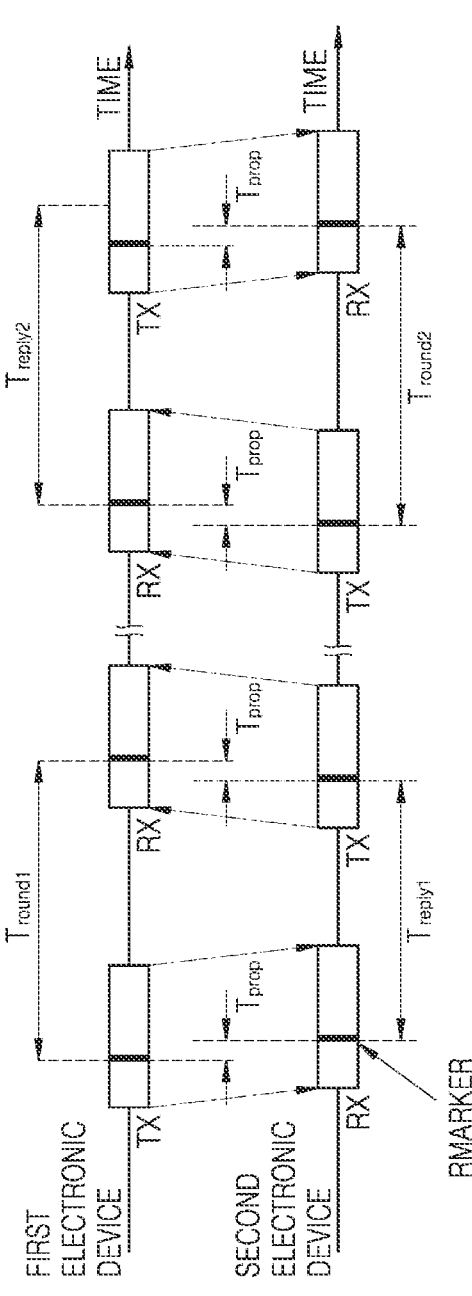
FIG. 1 illustrates a double-sided two-way ranging (DS-TWR) procedure according to an embodiment of the present disclosure.

According to an embodiment of the present disclosure, an operation method of a first electronic device may include: transmitting, by the first electronic device, a first ranging control message (RCM) including information for controlling a ranging procedure of a ranging group, the first RCM including time information configured for receiving a ranging request from a device not participating in the ranging group; receiving a ranging request from a second electronic device based on the time information; transmitting a second RCM including information about a slot allocated to the second electronic device; and performing ranging with the second electronic device based on the second RCM.

According to another embodiment of the present disclosure, an operation method of a second electronic device for performing ranging through ultra-wideband (UWB) may include: receiving a first ranging control message (RCM) from a first electronic device that controls a ranging procedure of a ranging group, the first RCM including time information configured for receiving a ranging request from a device not participating in the ranging group; transmitting a ranging request to the first electronic device based on the time information; receiving a second RCM including information about a slot allocated to the second electronic device; and performing ranging with the ranging group based on the second RCM.

According to another embodiment of the present disclosure, a first electronic device for performing ranging through ultra-wideband (UWB) may include: a communicator; a memory; and at least one processor configured to execute a program stored in the memory to control an operation of the first electronic device, wherein the at least one processor is further configured to control the first electronic device to transmit a first ranging control message (RCM) including information for controlling a ranging procedure of a ranging group, the first RCM including time information configured for receiving a ranging request from a device not participating in the ranging group, receive a ranging request from a second electronic device based on the time information, transmit a second RCM including information about a slot allocated to the second electronic device, and perform ranging with the second electronic device based on the second RCM.

According to another embodiment of the present disclosure, a second electronic device for performing ranging through ultra-wideband (UWB) may include: a communicator; a memory; and at least one processor configured to execute a program stored in the memory to control an operation of the second electronic device, wherein the at least one processor is further configured to receive a first ranging control message (RCM) from a first electronic device that controls a ranging procedure of a ranging group, the first RCM including time information configured for receiving a ranging request from a device not participating in the ranging group, transmit a ranging request to the first electronic device based on the time information, receive a second RCM including information about a slot allocated to the second electronic device, and perform ranging with the ranging group based on the second RCM.

MODE OF DISCLOSURE

Hereinafter, embodiments of the present disclosure will be described in detail with reference to the accompanying drawings for one of skill in the art to be able to perform the present disclosure without any difficulty. The present disclosure may, however, be embodied in many different forms and should not be construed as being limited to the embodiments of the present disclosure set forth herein. In addition, in order to clearly describe the present disclosure, portions that are not relevant to the description of the present disclosure are omitted, and similar reference numerals are assigned to similar elements throughout the present specification.

Although the terms used herein are generic terms, which are currently widely used and are selected by taking into consideration functions thereof, the meanings of the terms may vary according to intentions of those skilled in the art, legal precedents, or the advent of new technology. Thus, the terms should be defined not by simple appellations thereof but based on the meanings thereof and the context of descriptions throughout the present disclosure.

In addition, terms such as "first" or "second" may be used to describe various elements, but the elements should not be limited by the terms. These terms are only used to distinguish one element from another element.

In addition, terms used herein are for describing particular embodiments and are not intended to limit the scope of the present disclosure. The singular expression also includes the plural meaning as long as it is not inconsistent with the context. In addition, throughout the specification, when a part is referred to as being "connected to" another part, it may be "directly connected to" the other part or be "electrically connected to" the other part through an intervening element. In addition, when an element is referred to as "including" a component, the element may additionally include other components rather than excluding other components as long as there is no particular opposing recitation.

As used herein, the term "the" and other demonstratives similar thereto may include a singular form and plural forms. In addition, when there is no description explicitly specifying an order of operations of a method according to the present disclosure, the operations may be performed in an appropriate order. The present disclosure is not limited to the order of the operations described.

As used herein, phrases such as "in an embodiment" does not necessarily indicate the same embodiment of the present disclosure.

Some embodiments of the present disclosure may be represented by block components and various process operations. All or some of such functional blocks may be implemented by various numbers of hardware and/or software components that perform particular functions. For example, functional blocks of the present disclosure may be implemented by using one or more microprocessors, or by using circuit elements for intended functions. For example, the functional blocks of the present disclosure may be implemented by using various programming or scripting languages. The functional blocks may be implemented as an algorithm to be executed by one or more processors. In addition, the present disclosure may employ related-art techniques for electronic configuration, signal processing, and/or data processing, etc.

Also, connection lines or connection members between components illustrated in the drawings are merely illustrative of functional connections and/or physical or circuit connections. In an actual device, connections between components may be represented by various functional connections, physical connections, or circuit connections that are replaceable or added.

In general, wireless sensor network techniques are mainly classified into wireless local area network (WLAN) techniques and wireless personal area network (WPAN) techniques according to a range of recognition. WLAN, which is based on IEEE 802.11, is a technique for accessing a backbone network around a radius of 100 m. In addition, WPAN, which is based on IEEE 802.15, includes Bluetooth, ZigBee, ultra-wideband (UWB), etc. Wireless networks in which the wireless network techniques are realized may be composed of a plurality of communication electronic devices. In this case, the plurality of communication electronic devices may perform communication in an ACTIVE period by using a single channel. That is, the communication electronic devices may collect packets and transmit the collected packets, in the ACTIVE period.

UWB may denote a short-range, high-speed, wireless communication technique using a wide frequency band greater than or equal to several GHz, low spectrum density, and a narrow pulse width (1 nsec to 4 nsec), in a baseband state. UWB may also directly denote a band, in which UWB communication is applied. Hereinafter, a ranging method performed among electronic devices will be described based on a UWB communication method, however, this is only an example, and in practice, various wireless communication techniques may be used.

Electronic devices according to embodiments of the present disclosure may include a stationary terminal or a mobile terminal, implemented as a computer device, and may communicate with other devices and/or servers by using a wireless or wired communication method. For example, the electronic devices may include, but are not limited to, a smart phone, a mobile terminal, a laptop computer, a digital broadcasting terminal, a personal digital assistant (PDA), a portable multimedia player (PMP), a navigation device, a slate personal computer (PC), a tablet PC, a desktop computer, a digital television (TV), a refrigerator, an artificial intelligence speaker, a wearable device, a projector, a smart key, a smart car, a printer, and the like.

Device-to-device (D2D) communication refers to a method for direct communication between geographically adjacent electronic devices by using no infrastructures such as a base station. Various embodiments of the present disclosure relate to medium access control (MAC) based on D2D communication, and for MAC, a distance between electronic devices may need to be measured. At this time, a UWB ranging technique may be used to measure a distance between the electronic devices.

UWB ranging methods according to various embodiments of the present disclosure may be used for indoor positioning systems. The term 'indoor positioning system' refers to a system for measuring the location of an indoor moving object. For example, a UWB ranging technique may be used for a system for tracking the locations of human staff or products in a factory or an office.

In an indoor positioning system, the location of a certain electronic device may be obtained through message exchange between the electronic device and at least one electronic device, the location of which is already known. The at least one electronic device at the known location and the certain electronic device may estimate a time of flight (TOF) by exchanging messages including timestamps. The location of the certain electronic device may be estimated based on the TOF.

FIG. 1 illustrates a double-sided two-way ranging (DS-TWR) procedure according to an embodiment of the present disclosure.

FIG. 1 illustrates a DS-TWR method of obtaining a TOF through exchange of a poll frame and a response frame between a first electronic device and a second electronic device.

RMARKER denotes a time point at which a receiving antenna receives a message, $T_{round1}$ denotes a time period taken for the first electronic device to receive a response to a first message transmitted to the second electronic device, and $T_{reply1}$ denotes a time period taken for the second electronic device to transmit the response to the first message received from the first electronic device. $T_{round2}$ denotes a time period taken for the second electronic device to receive a response to a second message transmitted to the first electronic device, and $T_{reply2}$ denotes a time period taken for the first electronic device to transmit the response to the second message received from the second electronic device. The values of $T_{round1}$, $T_{round2}$, $T_{reply1}$, and $T_{reply2}$ may be calculated by using timestamps in the messages. The first electronic device or the second electronic device may estimate the value of $T_{prop}$, which corresponds to a TOF, based on $T_{round1}$, $T_{round2}$, $T_{reply1}$, and $T_{reply2}$ according to Equation 1 below. For example, the distance between the first electronic device and the second electronic device may be calculated by multiplying $T_{prop}$ by the speed of light (e.g., $3{\times}10^6$ m/s).

$$T_{prop} = \frac{(T_{round1} \times T_{round2} - T_{reply1} \times T_{reply2})}{T_{round1} + T_{round2} + T_{reply1} + T_{reply2}} \qquad \text{[Equation 1]}$$

An electronic device according to an embodiment of the present disclosure may use a ranging control message before performing a ranging procedure. Two device types related to ranging control may be referred to as "controller" or "controllee".

Figure 2A:
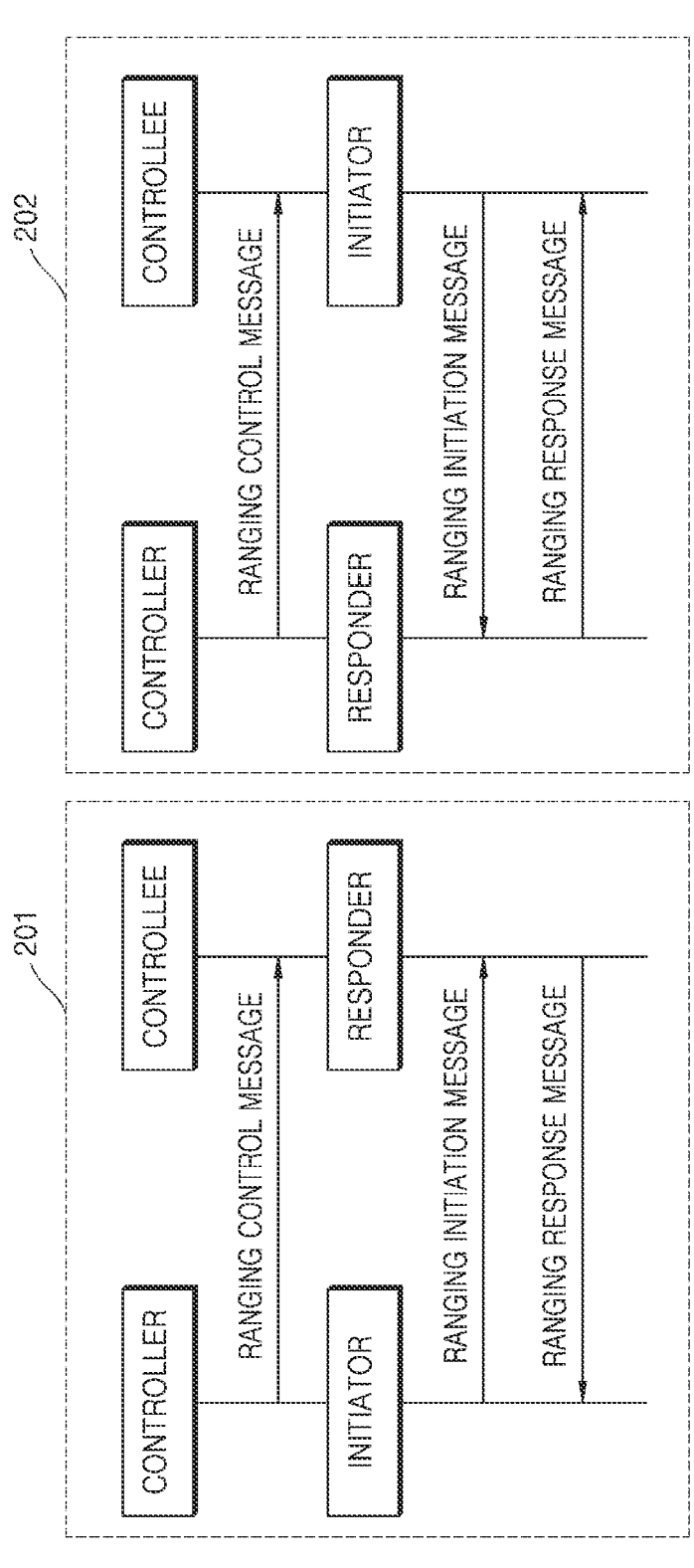
FIG. 2A illustrates an example of ranging using a ranging control frame.

FIG. 2A illustrates an example of ranging using a ranging control message.

First, a controller may be defined as a device for controlling ranging in a ranging group by transmitting a ranging control message (RCM) to a plurality of electronic devices that belong to the ranging group. The controller may broadcast an RCM including various information elements (IEs) such as ranging parameters, scheduling information, and the like. For example, the scheduling information included in the RCM broadcast by the controller may include information about when and which electronic device is to transmit a message while serving as an initiator or a responder. The initiator is an electronic device that transmits a ranging initiation message, which is a first message to be transmitted in a ranging message exchange process. The responder is an electronic device that responds to the ranging initiation message.

Meanwhile, the controllee may be defined as a device that uses ranging parameters received from the controller. At least one controllee may be managed by the controller. The controllee may perform ranging based on information in a received RCM. A method of determining a role of a device (e.g., to serve as a controller, a controllee, an initiator, or a responder) and selecting ranging parameters may be implemented in various ways. As illustrated in a flowchart 201 of FIG. 2A, when the controller performs configuration such that the controller transmits a ranging initiation message, the controller may serve as an initiator to transmit the ranging initiation message. On the other hand, as illustrated in a flowchart 202 of FIG. 2A, when the controller performs configuration such that the controllee transmits a ranging initiation message, the controllee may serve as an initiator to transmit the ranging initiation message.

The electronic device according to an embodiment of the present disclosure may perform ranging in units of ranging blocks.

Figure 2B:
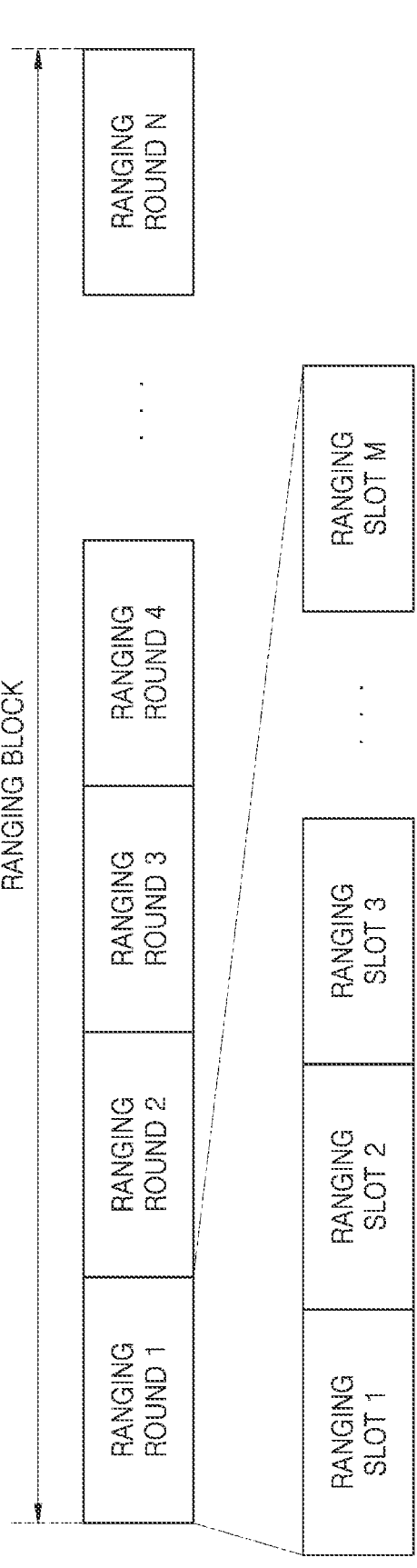
FIG. 2B illustrates an example of a time structure within a ranging period.

FIG. 2B illustrates an example of a time structure within a ranging period.

Ranging block is the largest time unit within a ranging time structure. A ranging block includes a plurality of ranging rounds. The term 'ranging round' refers to a period required for completing one entire range-measurement cycle for measuring a TOF between ranging devices participating in a ranging exchange. Among the ranging rounds, those allocated to electronic devices and in which the electronic devices transmit actual messages are defined as active ranging rounds.

A ranging round includes a plurality of ranging slots. The term 'ranging slot' refers to a period for transmitting one ranging frame. For example, in a ranging slot, one MAC frame (e.g., a ranging control frame, a poll frame, a response frame, etc.) defined in the standard document IEEE 802.15.4z may be transmitted. A ranging slot is a multiple of a ranging scheduling time unit (RSTU), which is a minimum transmission unit defined by a MAC layer, and the RSTU value varies depending on a PHY layer. For example, for high rate pulse repetition frequency (HRP) UWB PHY, 1 RSTU=833.33 ns.

According to various embodiments of the present disclosure, for one ranging round, one-way ranging (OWR), single-sided two-way ranging (SS-TWR), DS-TWR, or the like may be used for ranging and localization. Ranging frames for OWR, SS-TWR or DS-TWR may be transmitted in ranging slots of a ranging round.

Figure 2C:
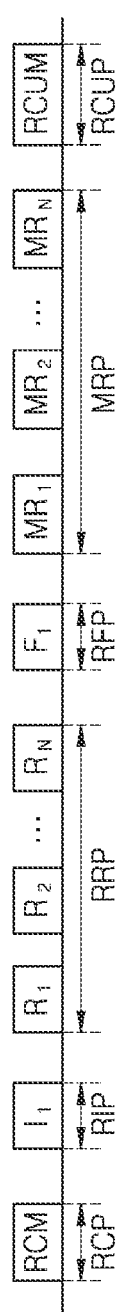
FIG. 2C is a timing diagram illustrating an example of a DS-TWR procedure.

FIG. 2C is a timing diagram illustrating an example of a DS-TWR procedure.

As illustrated in FIG. 2C, a ranging round includes a ranging control phase (RCP), a ranging initiation phase (RIP), a ranging response phase (RRP), a ranging final phase (RFP), a measurement report phase (MRP), and a ranging control update phase (RCUP).

As described above, an RCM is a control message that a controller broadcasts when a ranging round starts. A controller of a ranging group controls other electronic devices belonging to the ranging group by using ranging parameters, scheduling information, and the like included in the RCM. In FIG. 2C, $I_m$ is a ranging initiation message transmitted from initiator m. $R_n$ is a ranging response message transmitted from responder n. $F_m$ is a ranging final message transmitted from initiator m. $MR_m$ is a measurement report transmitted from initiator m or responder m. The term 'ranging control update message (RCUM)' refers to a message additionally transmitted at the end of a ranging round in order to update ranging parameters, etc. that a controller has previously transmitted through the RCM.

After a controller transmits an RCM in the RCP, an initiator transmits a ranging initiation message to responders in the RIP. In the RRP, each responder transmits a response message to the initiator as a response to the ranging initiation message previously transmitted in the RIP. When the initiator transmits a ranging final message to the responders in the RFP, the electronic devices transmit a ranging measurement report in the MRP. In the RCUP, an RCUM including update information about ranging parameters and the like is transmitted.

In order to apply UWB ranging to an indoor positioning system (e.g., a system for tracking the locations of human staff or products in an office), a procedure may be required, in which a tag node, the location of which is to be measured, joins a neighboring ranging group of neighboring anchor nodes, as a device participating in ranging (hereinafter, referred to as a participating ranging device (RDEV)).

Figure 3:
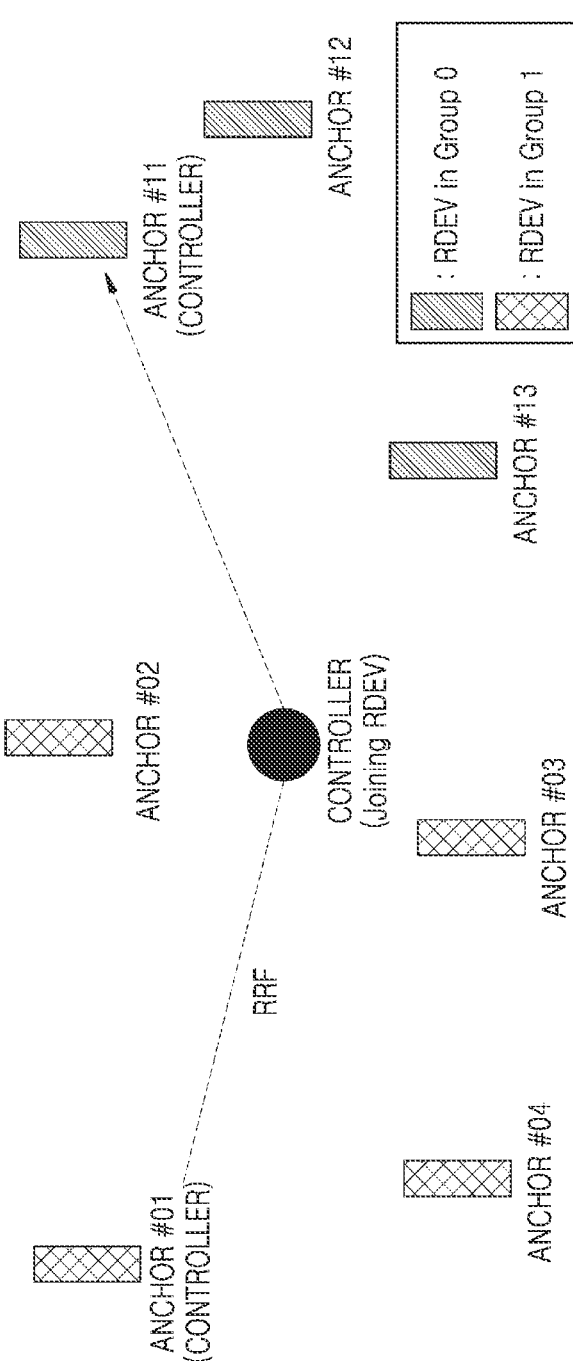
FIG. 3 illustrates an example of a process in which an electronic device participates in a ranging group.

FIG. 3 illustrates an example of a process in which an electronic device participates in a ranging group.

In order to perform a ranging procedure, a participating RDEV needs to join a ranging group by transmitting a ranging request frame (RRF) to a controller managing the ranging group, as illustrated in FIG. 3. The participating RDEV may take a strategy of transmitting an RRF at a time point pre-scheduled by a controller of a particular ranging group or transmitting an RRF in a contention-based manner at any time point.

The present disclosure proposes a contention-based RRF transmission method and a scheduling-based RRF transmission method, as a method, performed by a participating RDEV, of transmitting an RRF. Scheduling-based RRF transmission is performed in a ranging period (RP) that is a time period in which actual ranging is performed, whereas contention-based RRF transmission is performed in a ranging management period (RMP) that is separately allocated for transmission of management frames, not in an RP.

Hereinafter, a time structure for RPs and an RMPs, beacon transmission in an RMP, and beacon-enabled transmission will be first described, and a method, performed by a participating device, of transmitting an RRF according to various embodiments of the present disclosure will be then described.

Figure 4:
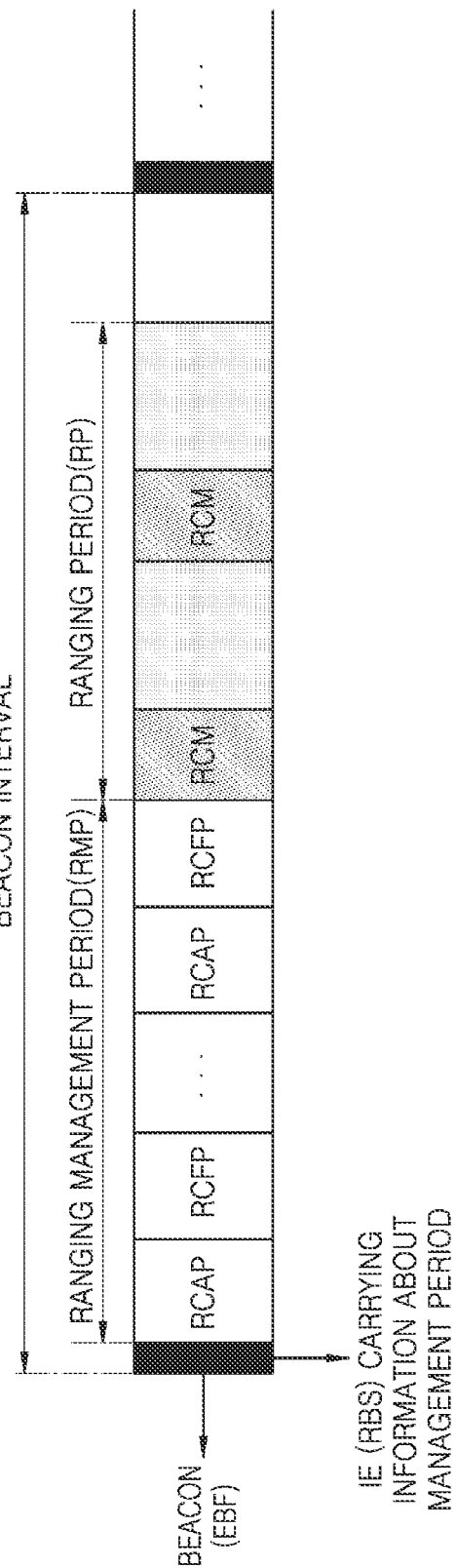
FIG. 4 illustrates a time structure used for beacon-enabled ranging.

FIG. 4 illustrates a time structure used for beacon-enabled ranging.

According to an embodiment of the present disclosure, the entire time structure used by a ranging group may be divided into an RMP allocated for transmission of a management frame and an RP allocated to perform actual ranging through exchange of ranging messages.

An enhanced beacon frame (EBF) including a ranging descriptor (RD) IE including total time structure information may be defined as a beacon.

As illustrated in FIG. 4, a beacon may be repeatedly transmitted at a beacon interval by a controller of the ranging group. The length of a beacon interval is defined as a multiple of a ranging beacon slot (RBS), which is defined as a multiple of an RSTU, which is the minimum unit of transmission. For example, 1 RSTU may be 833.33 ns.

Here, an RMP and an RP are composed of RBSs defined above, and thus the length thereof may be expressed in units of RBSs.

An RMP may include a ranging contention access period (RCAP) and a ranging contention free period (RCFP), which are smaller time units, according to a frame transmission method.

Figure 5:
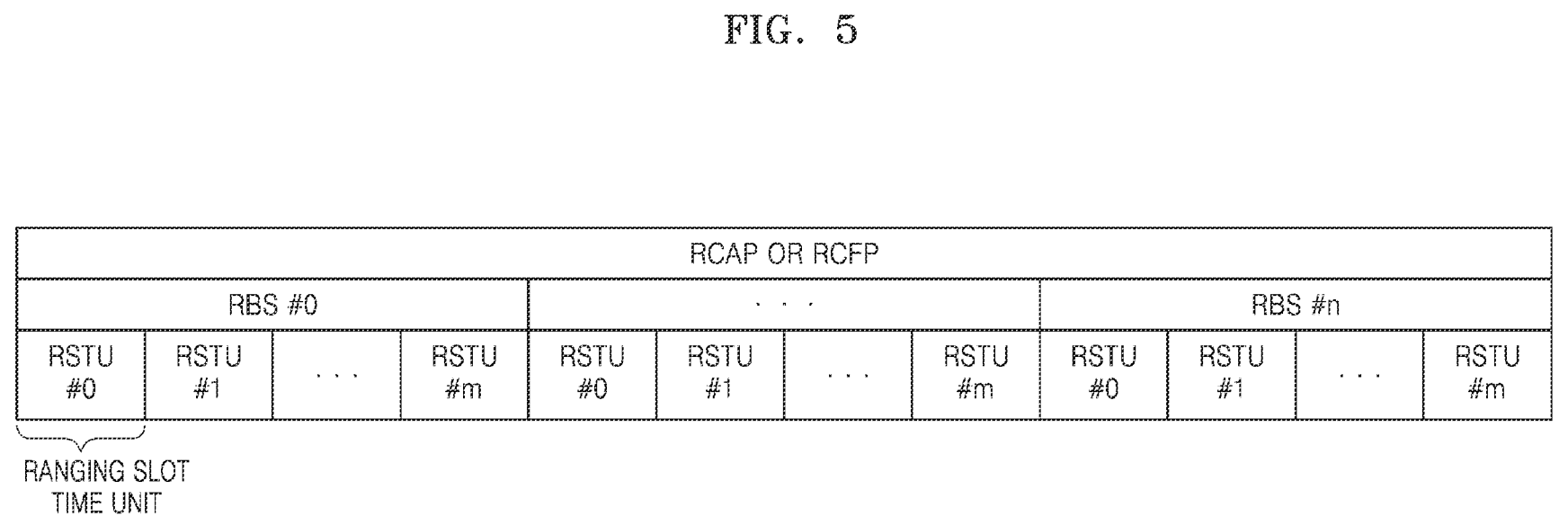

FIG. 5 illustrates a time structure of an RCAP or an RCFP.

Like an RMP, an RCAP and an RCFP may be composed of one or more RBSs. An electronic device of a ranging group may transmit a management frame in a contention-based manner in an RCAP, whereas the electronic device may transmit a management frame at a time point predetermined by a controller, in an RCFP. The term 'management frame' may refer to a frame transmitted for management of ranging group or management of ranging devices in a ranging group. For example, a beacon frame transmitted from a controller to a controllee, an RRF transmitted from a controllee to a controller, and the like may be included in a management frame.

FIG. 6 illustrates a RD IE format.

An RD IE carries information about a ranging time structure. An RD IE may be included in a beacon of a ranging time structure. A content field of an RD IE is configured as illustrated in FIG. 6. An RD IE may further include a beacon interval duration, transmission time information of a first RCM indicating a start time point of an RP, and time structure information of an RCAP and an RCFP constituting the RMP.

Referring to an RD IE 601 illustrated in FIG. 6, a 'Slot size multiplier for RBS' field carries information about a ranging slot duration as a multiplier of RSTU. The 'Slot size multiplier for RBS' field represents an RBS length in units of RTSUs. A 'Beacon interval' field carries information about a time interval until a next beacon. A beacon interval may be expressed as a multiple of RBS or a multiple of RSTU. Therefore, the length of the 'Beacon interval' field may vary depending on the unit in which the beacon interval is expressed.

A 'First RCM slot' field indicates a transmission location of a first RCM within a beacon interval of a ranging time structure, and may be expressed as a multiple of RBS or a multiple of RSTU. When no ranging interval exists within a current beacon interval, the value of the 'First RCM slot' field is 0. A 'Ranging management (RM) table length' field indicates the number of rows of an RM table. Each row of an RM table may be configured as illustrated in Table 602 of FIG. 6. When no RMP exists in a current ranging interval, the value of the 'RM Table length' field is 0.

The table 602 shows row elements constituting an RM table in an RD IE. Each row element of the RM table specifies the start RBS number and end RBS number of an RCAP or RCFP present in an RMP. An 'RCAP/RCFP indicator' field in each row element indicates whether a set of slots specified in a corresponding row uses an RCAP or RCFP. For example, when the value of the 'RCAP/RCFP indicator' field is 0, the corresponding row element is time information for an RCAP, and, on the contrary, when the value of the 'RCAP/RCFP indicator' field is 1, the corresponding row element is time information for an RCFP.

According to various embodiments of the present disclosure, a method of transmitting and receiving control frames including an RRF, between a participating RDEV and a controller is proposed. In particular, according to various embodiments of the present disclosure, a time point in a beacon interval at which a participating RDEV may transmits an RRF in order to join a ranging group, is designed.

According to an embodiment, the participating RDEV may transmit an RRF in a contention-based manner in any RCAP within an RMP without separate scheduling.

According to another embodiment, a controller may pre-schedule time resources within an RP, and the participating RDEV may transmit an RRF at a scheduled time point.

Hereinafter, before describing a method of transmitting an RRF in a contention-based manner in an RCAP according to an embodiment of the present disclosure, an acknowledgement (ACK) IE used for frame transmission within an RMP will be described.

FIG. 7 illustrates a format of an ACK IE.

An electronic device capable of performing ranging may recognize, upon, after transmitting a frame, receiving an ACK message for the transmitted frame before a predetermined timeout period elapses, that the transmission of the frame has been successfully performed.

Table 701 of FIG. 7 shows a format of an ACK IE constituting an ACK message. When the frame transmitted by the electronic device is a normal data frame, the value of an 'RRF indicator' field of the ACK message may be 0. On the other hand, when the frame transmitted by the electronic device is an RRF, the value of the 'RRF indicator' field of the ACK message may be 1, and the value of an 'ACK field value' field may include a result of a ranging request as shown in a table 702. For example, when the value of the 'ACK field value' field is 0, it may mean that the controller rejects the ranging request of the electronic device. When the value of the 'ACK field value' field is 1, it may mean that the controller accepts the ranging request of the electronic device.

Figure 8:
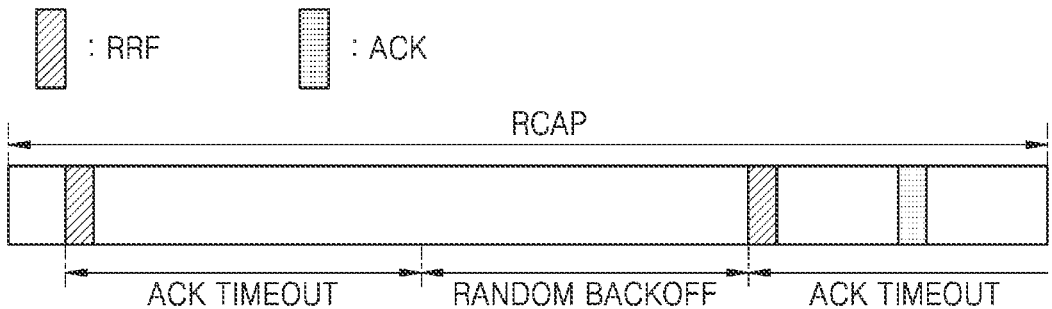
FIG. 8 illustrates an example of a time structure in which an electronic device transmits a ranging request frame (RRF) within an RCAP and receives an ACK transmitted in response to the RRF, according to an embodiment.

FIG. 8 illustrates an example of a time structure in which an electronic device transmits an RRF within an RCAP and receives an ACK transmitted in response to the RRF, according to an embodiment.

As illustrated in FIG. 8, the electronic device according to an embodiment may transmit frames including an RRF in a contention-based manner in an RCAP within an RMP. The electronic device may transmit a frame to a controller in a contention-based manner in the RCAP within the RMP.

After transmitting the frame, the electronic device waits for reception of an ACK message for a predetermined ACK timeout period. When no ACK message is received until the ACK timeout period elapses, the electronic device may consider that the transmission of the frame has failed. When it is considered that the transmission of the frame has failed, the electronic device may retransmit the frame after a random backoff period has elapsed.

When a participating RDEV transmits an RRF and receives an ACK message within the ACK timeout period, the participating RDEV may check the 'ACK field value' field included in the ACK message to determine whether the controller has accepted a ranging request. When it is confirmed that the controller has accepted the ranging request of the participating RDEV, the participating RDEV may join a corresponding ranging group and perform a ranging procedure based on an RCM transmitted by the controller within an RP.

As illustrated in FIG. 8, in order to transmit an RRF in an RCAP within an RMP, the RMP should exist in a beacon interval other than an RP in which actual ranging is performed. However, in the beacon-enabled ranging time structure illustrated in FIG. 4, the beacon interval may be composed of only one or more RPs without an RMP.

Therefore, the method illustrated in FIG. 8 may not be used in a beacon interval composed of only RPs, the participating RDEV may have to wait for a long time until it encounters a beacon interval including an RMP.

On the other hand, even when an RMP exists in every beacon interval, the participating RDEV to transmit an RRF is able to determine when an RCAP comes out only when a beacon is received. Accordingly, the participating RDEV may have to wait about a half of a beacon interval on average so as to receive the beacon When the controller broadcasts a beacon in a short period for quick participating, the participating RDEV may have to listen to a medium more frequently to receive the beacon. That is, when the controller broadcasts a beacon in a short period, the participating RDEV may have to wake up more frequently to receive the beacon.

Therefore, when a beacon transmission period is shortened, the power consumption of the participating RDEV increases, and thus the power consumption of the controller also increases.

Accordingly, according to another embodiment of the present disclosure, a method of allowing a participating device to join a ranging group within an RP other than an RMP is proposed. That is, by scheduling an RRF by using IEs defined within an RP, a participating procedure may be performed with relatively low overhead, and the power consumption of the controller and the participating RDEV may be minimized.

The controller according to an embodiment of the present disclosure may perform scheduling for transmitting an RRF within an RP. According to an embodiment of the present disclosure, the controller may pre-schedule time resources in the RP, and the participating RDEV may transmit an RRF to the controller at a scheduled time point.

Hereinafter, a controller for controlling a ranging group and an operation method of a participating RDEV to join the ranging group according to some embodiments of the present disclosure will be described in detail. When ranging is performed between a plurality of electronic devices included in a ranging group, one of the plurality of electronic devices may serve as a controller and the other electronic devices may serve as controllees. In addition, an electronic device participating in a certain ranging group may be a participating RDEV that intends to newly join another ranging group. Therefore, in the following description, a controller of a ranging group may be referred to as a first device, and a participating RDEV to join the ranging group may be referred to as a second device. However, the terms "first" and "second" are used only to distinguish one device from another, and an embodiment is not limited to the following descriptions.

Figure 9:
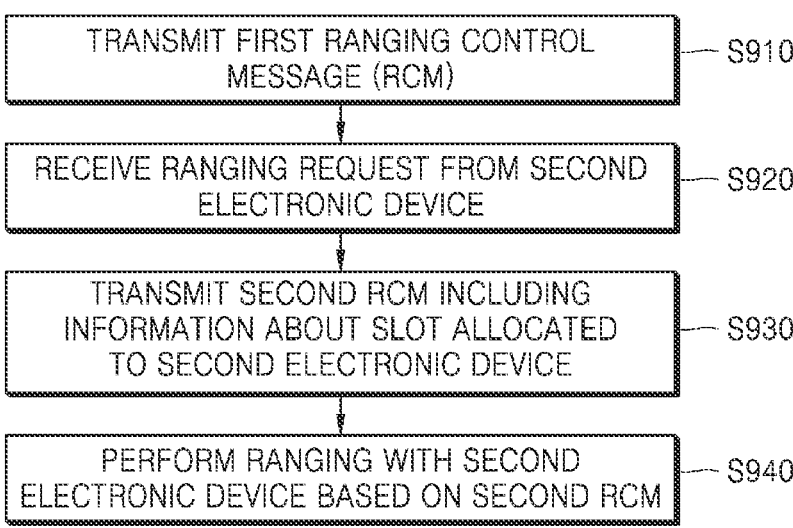
FIG. 9 illustrates a flowchart of an operation method of a first electronic device according to an embodiment.

FIG. 9 illustrates a flowchart of an operation method of a first electronic device to perform ranging through UWB, according to an embodiment.

In operation S910, the first electronic device according to an embodiment of the present disclosure may transmit a first RCM including information for controlling a ranging procedure of a ranging group. The first electronic device may broadcast the first RCM to neighboring electronic devices. The first electronic device may broadcast the first RCM to an electronic device participating in the ranging group, and an electronic device intending to join the ranging group. The first RCM according to an embodiment may include time information configured for receiving a ranging request from a device not participating in the ranging group.

For example, the time information configured for receiving a ranging request may include transmission offset information for an RRF.

The first RCM may include a ranging round IE (RR IE) used for ranging of the ranging group. The RR IE may contain information of a current ranging round and may further include an offset configured for receiving a ranging request from a device not participating in the ranging group. A format of an RR IE modified according to an embodiment of the present disclosure is illustrated in FIG. 10.

As another example, the time information configured for receiving a ranging request may include transmission slot information for an RRF.

The first RCM may include a ranging device management IE (RDM IE) including information about slots allocated to devices included in the ranging group. The RDM IE may further include information about a slot designated to receive a ranging request. In the RDM IE according to an embodiment, the address of a slot designated to receive a ranging request may be specified as a certain value. For example, the address for a slot designated to receive a ranging request may be specified as 0xFFFF. A format of an RDM IE according to an embodiment of the present disclosure is shown in FIG. 12.

In operation S920, the first electronic device according to an embodiment of the present disclosure may receive a ranging request from a second electronic device based on the time information.

For example, the second electronic device may transmit an RRF to the first electronic device at a time point determined based on the transmission offset information for the RRF included in the first RCM. The first electronic device may receive the RRF as a ranging request.

As another example, the second electronic device may transmit an RRF to the first electronic device at a time point determined based on the transmission slot information for the RRF included in the first RCM. The first electronic device may receive the RRF as a ranging request.

In operation S930, the first electronic device according to an embodiment of the present disclosure may transmit a second RCM including information about a slot allocated to the second electronic device.

The first electronic device according to an embodiment may determine whether to accept the ranging request of the second electronic device. The first electronic device may allocate a certain slot to the second electronic device based on determination to accept the ranging request of the second electronic device. The first electronic device may generate and transmit the second RCM including the slot allocated to the second electronic device and an address of the second electronic device. For example, the second RCM may include an RDM IE including information about a slot and a role allocated to each of the devices of the ranging group including the second electronic device, and an address of each device.

In operation S940, the first electronic device according to an embodiment of the present disclosure may perform ranging with the second electronic device based on the second RCM.

After the second electronic device according to an embodiment participates in the ranging group, the first electronic device and the second electronic device may transmit and receive frames for ranging to and from each other, measure a time period taken for a ranging frame to be delivered, and calculate the distance between the first electronic device and the second electronic device based on the measured time period.

When the first electronic device is configured, by the second RCM, to transmit a poll frame, the first electronic device may serve as an initiator to transmit the poll frame. On the other hand, when the second electronic device is configured, by the second RCM, to transmit a poll frame, the second electronic device may serve as an initiator to transmit the poll frame.

According to an embodiment of the present disclosure, electronic devices may perform ranging in various ways. For example, single-sided two-way ranging or double-sided two-way ranging may be performed between electronic devices participating in a ranging group.

Single-sided two-way ranging is a method of performing ranging by measuring a round-trip delay of a message transmitted from one electronic device to another electronic device and a response transmitted to the electronic device. Double-sided two-way ranging is an extension of single-sided two-way ranging, and is a method of measuring a round-trip time period twice and combining two measured round-trip time periods to derive a TOF.

For example, when the first electronic device and the second electronic device perform single-sided two-way ranging based on the second RCM, and the first electronic device is set as an initiator while the second electronic device is set as a responder, the ranging may be performed as follows. The first electronic device may transmit a first ranging frame to the second electronic device and receive a second ranging frame transmitted from the second electronic device in response to the first ranging frame. The first electronic device may calculate, based on the first ranging frame and the second ranging frame, a time period required for the second ranging frame to be delivered from the second electronic device to the first electronic device. The first electronic device may calculate the distance between the first electronic device and the second electronic device based on the calculated time period.

Referring to FIG. 10, a format of an RR IE modified according to an embodiment of the present disclosure is illustrated.

According to an embodiment of the present disclosure, scheduling information about a ranging round in which a 'Transmission offset for RRF' field is added to an existing RR IE may be delivered.

A 'Ranging block index' field of the RR IE illustrated in FIG. 10 includes index information of a ranging block to which the ranging round belongs, and the range of the field is 0 to 65535. A 'Hopping mode' field is an indicator bit indicating whether the ranging block to which the ranging round belongs uses a hopping mode. When the value of the 'Hopping mode' field is 0, the electronic device uses a no hopping mode, and when the value is 1, the electronic device uses a hopping mode. A 'Transmission offset' field includes a transmission offset value of a ranging round within a ranging block, a 'Transmission offset for RRF' field indicates a transmission offset value for RRF transmission of the ranging round, and the unit thereof is RSTU.

The RR IE modified according to an embodiment of the present disclosure is included in an RCM and then transmitted at the start of the ranging round, and information about a next ranging round is transmitted together with an RCUM or a ranging interval update message (RIUM) at the end of the current ranging round.

In an RRF scheduling method using a transmission offset according to an embodiment, a transmission time point for RRF transmission is added to a ranging slot. As illustrated in FIG. 10, in the RR IE modified according to an embodiment of the present disclosure, the 'Transmission offset for RRF' field is added to the existing RR IE.

Figure 11:
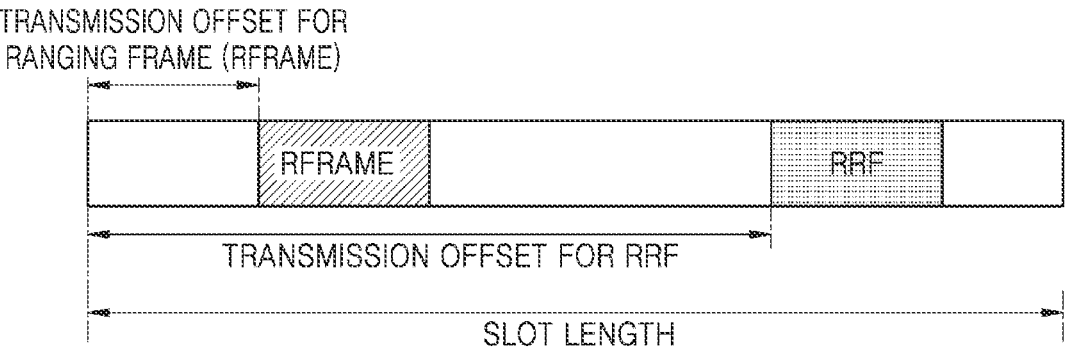
FIG. 11 illustrates an example of a time structure in which a first electronic device receives an RRF within a ranging slot by using a modified RR IE, according to an embodiment.

FIG. 11 illustrates an example of a time structure in which a first electronic device receives an RRF within a ranging slot by using a modified RR IE, according to an embodiment.

A second electronic device may receive an RCM broadcast by a controller (hereinafter, referred to as a first electronic device) of a neighboring ranging group through a listening process. The second electronic device may identify transmission information (e.g., a time structure, an RRF-transmittable transmission offset, etc.) of the corresponding ranging group based on the received RCM. The second electronic device transmits an RRF to the first electronic device by using the information obtained through the RCM reception. The second electronic device having transmitted the RRF may determine whether a ranging request is successful, by confirming that the address of the second electronic device is included in an RDM IE of a next RCM transmitted by the first electronic device. The second electronic device may use the RDM IE as a block ACK for the RRF. When it is determined that the RRF transmission has failed, the second electronic device may retransmit the RRF after a random backoff period elapses, or transmit the RRF to a controller of another ranging group.

FIG. 12 illustrates a format of an RDM IE according to an embodiment.

According to an embodiment of the present disclosure, transmission slot information for an RRF may be added to an existing RDM IE and then transmitted. In a method of allocating slots for RRF transmission according to an embodiment of the present disclosure, it is required to indicate that slots allocated for RRF transmission within an RP are dedicated slots for the RRF transmission. Accordingly, an RDM IE including scheduling information of the slots is modified according to an embodiment of the present disclosure.

Table 1201 of FIG. 12 shows a format of an RDM IE to be included in an RCM and then transmitted. The RDM IE includes scheduling for electronic devices included in a ranging group and type information of each of the electronic devices.

A 'Slot index present (SIP)' field of the RDM IE indicates whether a 'Slot index' field is used in an RDM table row element 1202. When the value of the 'SIP' field is 0, the RDM table row element 1202 excludes the 'Slot index' field, and when the value of the 'SIP' field is 1, the RDM table row element 1202 includes the 'Slot index' field. An 'RDM table length' field defines the number of RDM table row elements 1202. Therefore, when the value of the 'SIP' field is 1, the value of the 'RDM table length' field is equal to the number of allocated time slots. On the contrary, when the value of the 'SIP' field is 0, the value of the 'RDM table length' is equal to the number of electronic devices included in the ranging group. In addition, a 'Device type' field of the RDM table row element 1202 defines the type (e.g., initiator or responder) of a ranging electronic device, and an 'Address' field contains address information of the ranging electronic device. The address information may be represented by a short format having a size of 2 octets or an extended format having a size of 8 octets.

Figure 13:
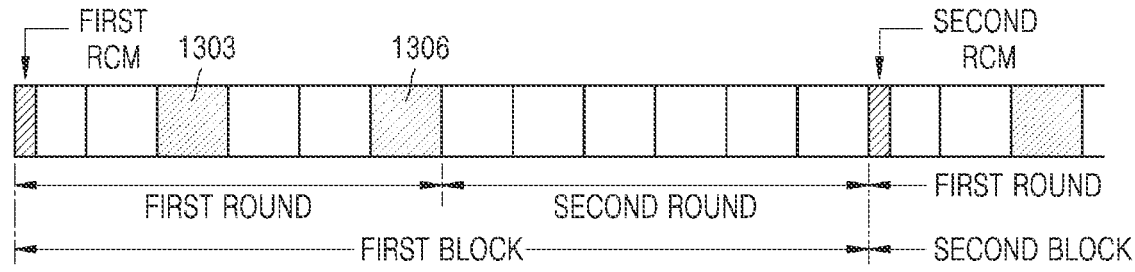
FIG. 13 illustrates an example of a time structure of a ranging period (RP) in which an additional slot for RRF reception is allocated, according to an embodiment.

FIG. 13 illustrates an example of a time structure of an RP in which an additional slot for RRF reception is allocated, according to an embodiment.

A first electronic device according to an embodiment of the present disclosure may designate slots 1303 and 1306 for transmitting an RRF within an RP. For the slots 1303 and 1306 allocated for RRF transmission, an RDM IE in an RCM may specify the addresses of the slots as 0xFFFF rather than the address of a particular electronic device. That is, the slots 1303 and 1306, the addresses of which are specified as 0xFFFF in the RDM IE, are allocated such that a participating RDEV transmits the RRF to a controller.

FIG. 14 illustrates an example of an RDM IE including information about slots designated to receive a ranging request, according to an embodiment.

In FIG. 13, when an RDM IE in a first RCM includes the RDM table shown in FIG. 14, a second electronic device may transmit an RRF to the first electronic device in slots 3 and 6, the addresses of which are specified as 0xFFFF in the RDM IE.

FIG. 15 illustrates an example of an RDM IE included in a second RCM transmitted by the first electronic device when two participating RDEVs succeed in participating, in a first block of FIG. 13.

FIG. 15 illustrates an example of an RDM IE including slots allocated to electronic devices from which ranging requests are received, and the addresses of the electronic devices, according to an embodiment.

Men the addresses of participating RDEVs having succeeded in participating are 0x1234 and 0x42AD, respectively, slots 1 and 2 may be allocated to the participating RDEVs, respectively. The first electronic device may transmit, a second RCM including the slots and roles allocated to the participating RDEVs having succeeded in participating, and the addresses of the participating RDEVs. An RDM IE of the second RCM specifies the addresses of slots 3 and 6 as 0xFFFF as in the RDM IE of the first RCM, to allow a newly participating RDEV to transmit an RRF.

When the RDM IE of the second RCM includes slots allocated to the participating RDEVs, the participating RDEVs having transmitted RRFs in the first block may determine that they have succeeded in participating in the ranging group.

Figure 16:
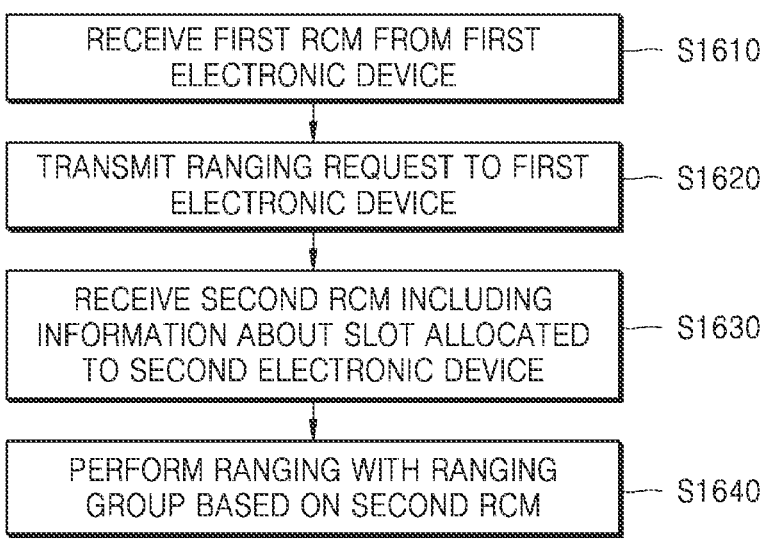
FIG. 16 illustrates a flowchart of an operation method of a second electronic device according to an embodiment.

FIG. 16 illustrates a flowchart of an operation method of a second electronic device according to an embodiment.

In operation S1610, the second electronic device according to an embodiment of the present disclosure may receive a first RCM from a first electronic device that controls a ranging procedure of a ranging group. The first RCM according to an embodiment may include time information configured for receiving a ranging request from a device not participating in the ranging group.

For example, the time information configured for receiving a ranging request may include transmission offset information for an RRF.

The first RCM may include an RR IE used for ranging of the ranging group. The RR IE may contain information of a current ranging round and may further include an offset configured for receiving a ranging request from a device not participating in the ranging group. A format of an RR IE modified according to an embodiment of the present disclosure is illustrated in FIG. 10, and the descriptions thereof provided above will be omitted.

As another example, the time information configured for receiving a ranging request may include transmission slot information for an RRF.

The first RCM may include an RDM IE including information about slots allocated to devices included in the ranging group. The RDM IE may further include information about a slot designated to receive a ranging request. In the RDM IE according to an embodiment, the address of a slot designated to receive a ranging request may be specified as a certain value. For example, the address for the slot designated to receive the ranging request may be specified as 0xFFFF. A format of an RDM IE according to an embodiment of the present disclosure is illustrated in FIG. 12, and the descriptions thereof provided above will be omitted.

In operation S1620, the second electronic device according to an embodiment of the present disclosure may transmit a ranging request to the first electronic device based on the time information.

For example, the second electronic device may transmit an RRF to the first electronic device at a time point determined based on transmission offset information for the RRF included in the first RCM.

As another example, the second electronic device may transmit an RRF to the first electronic device at a time point determined based on the transmission slot information for the RRF included in the first RCM.

In operation S1630, the second electronic device according to an embodiment of the present disclosure may receive, from the first electronic device, a second RCM including information about a slot allocated to the second electronic device.

For example, the second RCM may include an RDM IE including information about a slot and a role allocated to each of devices of the ranging group including the second electronic device, and an address of each device. When the RDM IE of the second RCM includes a slot allocated to the second electronic device, the second electronic device may determine that the second electronic device has succeeded in participating in the ranging group.

In operation S1640, the second electronic device according to an embodiment of the present disclosure may perform ranging with the ranging group based on the second RCM.

After the second electronic device according to an embodiment participates in the ranging group, the second electronic device and other electronic devices of the ranging group may transmit and receive frames for ranging to and from each other, measure a time period taken for a ranging frame to be delivered, and calculate the location of the second electronic device based on the measured time period. A method of performing ranging may be variously modified according to an implementation, and the descriptions provided above with reference to FIG. 9 will be omitted.

Figure 17:
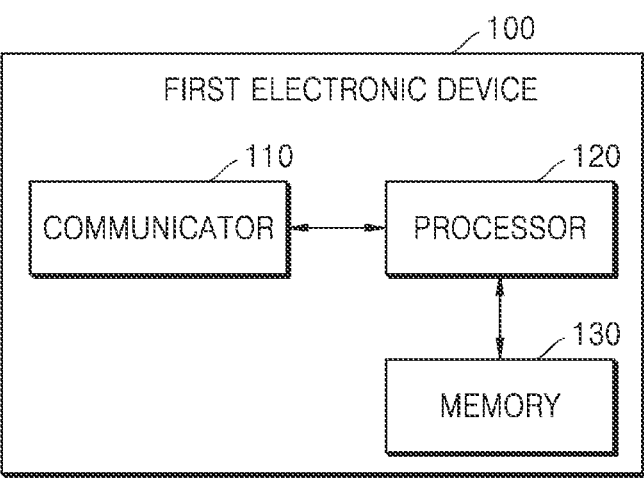
FIG. 17 illustrates a block diagram of a first electronic device according to an embodiment.

FIG. 17 illustrates a block diagram of a first electronic device according to an embodiment.

A first electronic device 100 according to various embodiments of the present disclosure may be a stationary terminal or a mobile terminal. The first electronic device 100 may be, for example, at least one of a smart phone, a navigation device, a computer, a digital broadcasting terminal, a smart home appliance, an artificial intelligence speaker, a personal digital assistant (PDA), a portable multimedia player (PMP), a smart key, and a wearable device, but is not limited thereto. The first electronic device 100 may communicate with another device and/or a server through a network by using a wireless or wired communication scheme.

Referring to FIG. 17, the first electronic device 100 according to various embodiments of the present disclosure may include a communicator 110, a processor 120, and a memory 130. However, the first electronic device 100 may be implemented by more or fewer components than those illustrated in FIG. 17.

Although FIG. 17 illustrates that the first electronic device 100 includes one processor, the embodiment is not limited thereto, and the first electronic device 100 may include a plurality of processors. At least some of the following operations and functions of the processor 120 may be performed by a plurality of processors. The first electronic device 100 illustrated in FIG. 17 may perform operation methods of the first electronic device 100 according to various embodiments of the present disclosure, and the descriptions provided above with reference to FIGS. 1 to 16 may be applied thereto. Therefore, the descriptions provided above will be omitted.

The communicator 110 according to an embodiment of the present disclosure may perform wired/wireless communication with another device or a network. To this end, the communicator 110 may include a communication module that supports at least one of various wired/wireless communication methods. For example, the communication module may be in the form of a chipset, or may be a sticker/barcode (e.g., a sticker including a near-field communication (NFC) tag) including information necessary for communication.

The wireless communication may include, for example, at least one of cellular communication, wireless fidelity (Wi-Fi), Wi-Fi Direct, Bluetooth, UWB, or NFC. The wired communication may include, for example, at least one of Universal Serial Bus (USB) or High-Definition Multimedia Interface (HDMI).

In an embodiment, the communicator 110 may include a communication module for short-range communication. For example, the communicator 110 may include a communication module for performing various types of short-range communication such as infrared communication or magnetic secure transmission (MST), in addition to UWB, Wi-Fi, Wi-Fi Direct, Bluetooth, and NFC described above.

The processor 120 according to an embodiment of the present disclosure may execute a program stored in the memory 130 to control the overall operation of the first electronic device 100, and may include at least one processor, such as a central processing unit (CPU) or a graphics processing unit (GPU). The processor 120 may control other components included in the first electronic device 100 to perform UWB ranging.

The descriptions provided above with reference to FIG. 9 may be applied to a detailed method, performed by the processor 120, of performing ranging by controlling the overall operation of the first electronic device 100, and thus the description thereof will be omitted.

The processor 120 according to an embodiment may broadcast a first RCM including information for controlling a ranging procedure of a ranging group. The processor 120 may broadcast, through the communicator 110, the first RCM to an electronic device participating in the ranging group, and an electronic device intending to join the ranging group. The first RCM according to an embodiment may include time information configured for receiving a ranging request from a device not participating in the ranging group.

For example, the time information configured for receiving a ranging request may include transmission offset information for an RRF.

The first RCM may include an RR IE used for ranging of the ranging group. The RR IE may contain information of a current ranging round and may further include an offset configured for receiving a ranging request from a device not participating in the ranging group. A format of an RR IE modified according to an embodiment of the present disclosure is illustrated in FIG. 10.

As another example, the time information configured for receiving a ranging request may include transmission slot information for an RRF.

The first RCM may include an RDM IE including information about slots allocated to devices included in the ranging group. The RDM IE may further include information about a slot designated to receive a ranging request. For example, in the RDM IE according to an embodiment, the address of a slot designated to receive a ranging request may be specified as a certain value. For example, the address for a slot designated to receive a ranging request may be specified as 0xFFFF. A format of an RDM IE according to an embodiment of the present disclosure is shown in FIG. 12.

The processor 120 according to an embodiment may receive a ranging request from the second electronic device, based on the time information included in the first RCM. The processor 120 may receive an RRF from the second electronic device at a time point determined based on transmission offset information for the RRF included in the first RCM.

The processor 120 according to another embodiment may receive an RRF from the second electronic device at a time point determined based on transmission slot information for the RRF included in the first RCM.

The processor 120 according to an embodiment may determine whether to accept the ranging request of the second electronic device. The processor 120 may determine to accept the ranging request of the second electronic device, and allocate a certain slot to the second electronic device. The processor 120 may transmit a second RCM including the slot allocated to the second electronic device and an address of the second electronic device. For example, the processor 120 may transmit the second RCM including an RDM IE including information about a slot and a role allocated to each of devices of the ranging group including the second electronic device, and an address of each device.

The processor 120 according to an embodiment may perform ranging with the second electronic device based on the second RCM. After the second electronic device according to an embodiment participates in the ranging group, the processor 120 and the second electronic device may transmit and receive frames for ranging to and from each other, measure a time period taken for a ranging frame to be delivered, and calculate the distance between the first electronic device and the second electronic device based on the measured time period.

Figure 18:
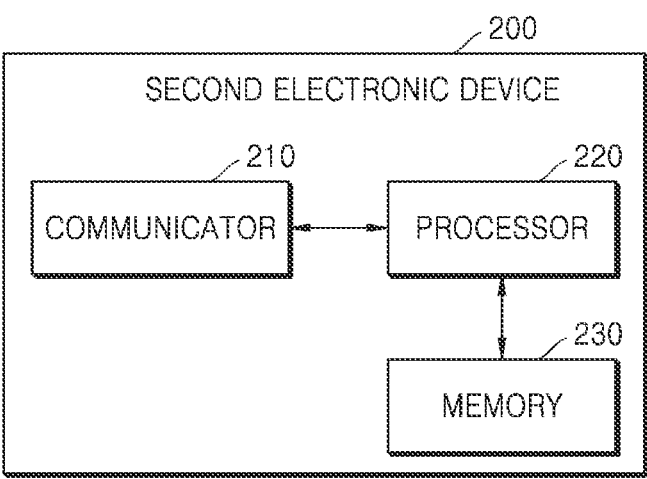
FIG. 18 illustrates a block diagram of a second electronic device according to an embodiment.

FIG. 18 illustrates a block diagram of a second electronic device according to an embodiment.

A second electronic device 200 according to various embodiments of the present disclosure may be a stationary terminal or a mobile terminal. The second electronic device 200 may be, for example, at least one of a smart phone, a navigation device, a computer, a digital broadcasting terminal, a smart home appliance, an artificial intelligence speaker, a PDA, a PMP, a smart key, and a wearable device, but is not limited thereto. The second electronic device 200 may communicate with another device and/or a server through a network by using a wireless or wired communication scheme.

Referring to FIG. 18, the second electronic device 200 according to various embodiments of the present disclosure may include a communicator 210, a processor 220, and a memory 230. However, the second electronic device 200 may be implemented by more or fewer components than those illustrated in FIG. 18.

Although FIG. 18 illustrates that the second electronic device 200 includes one processor, the embodiment is not limited thereto, and the second electronic device 200 may include a plurality of processors. At least some of the following operations and functions of the processor 220 may be performed by a plurality of processors. The second electronic device 200 illustrated in FIG. 18 may perform an operation method according to various embodiments of the present disclosure, and the descriptions provided above with reference to FIGS. 1 to 16 may be applied thereto. Therefore, the descriptions provided above will be omitted.

The communicator 210 according to an embodiment of the present disclosure may perform wired/wireless communication with another device or a network. To this end, the communicator 210 may include a communication module that supports at least one of various wired/wireless communication methods. For example, the communication module may be in the form of a chipset, or may be a sticker/barcode (e.g., a sticker including an NFC tag) including information necessary for communication.

The wireless communication may include, for example, at least one of cellular communication, Wi-Fi, Wi-Fi Direct, Bluetooth, UWB, or NFC. The wired communication may include, for example, at least one of USB or HDMI.

In an embodiment, the communicator 210 may include a communication module for short-range communication. For example, the communicator 210 may include a communication module for performing various types of short-range communication such as infrared communication or MST, in addition to UWB, Wi-Fi, Wi-Fi Direct, Bluetooth, and NFC described above.

The processor 220 according to an embodiment of the present disclosure may execute a program stored in the memory 130 to control the overall operation of the second electronic device 200, and may include at least one processor, such as a CPU or a GPU.

The processor 220 may control other components included in the second electronic device 200 to perform UWB ranging. The descriptions provided above with reference to FIG. 16 may be applied to a detailed method, performed by the processor 220, of performing ranging by controlling the overall operation of the second electronic device 200, and thus the description thereof will be omitted.

The processor 220 according to an embodiment may receive a first RCM from a first electronic device that controls a ranging procedure of a ranging group. The first RCM according to an embodiment may include time information configured for receiving a ranging request from a device not participating in the ranging group.

For example, the time information configured for receiving a ranging request may include transmission offset information for an RRF. The first RCM may include an RR IE used for ranging of the ranging group. The RR IE may contain information of a current ranging round and may further include an offset configured for receiving a ranging request from a device not participating in the ranging group. A format of an RR IE modified according to an embodiment of the present disclosure is illustrated in FIG. 10.

As another example, the time information configured for receiving a ranging request may include transmission slot information for an RRF. The first RCM may include an RDM IE including information about slots allocated to devices included in the ranging group. The RDM IE may further include information about a slot designated to receive a ranging request. For example, in the RDM IE according to an embodiment, the address of a slot designated to receive a ranging request may be specified as a certain value. For example, the address for a slot designated to receive a ranging request may be specified as 0xFFFF. A format of an RDM IE according to an embodiment of the present disclosure is shown in FIG. 12.

The processor 220 according to an embodiment may transmit a ranging request to the first electronic device based on the time information included in the first RCM.

For example, the processor 220 may transmit an RRF to the first electronic device at a time point determined based on transmission offset information for the RRF included in the first RCM.

As another example, the processor 220 may transmit an RRF to the first electronic device at a time point determined based on the transmission slot information for the RRF included in the first RCM.

The processor 220 according to an embodiment may receive, from the first electronic device, a second RCM including information about a slot allocated to the second electronic device.

For example, the second RCM may include an RDM IE including information about a slot and a role allocated to each of devices of the ranging group including the second electronic device, and an address of each device. When the RDM IE of the second RCM includes a slot allocated to the second electronic device, the second electronic device may determine that the second electronic device has succeeded in participating in the ranging group.

The processor 220 according to an embodiment may perform ranging with the ranging group based on the second RCM.

After the second electronic device according to an embodiment participates in the ranging group, the processor 220 according to an embodiment and other electronic devices of the ranging group may transmit and receive frames for ranging to and from each other, measure a time period taken for a ranging frame to be delivered, and calculate a distance between the second electronic device and the other electronic devices based on the measured time period.

Various embodiments of the present disclosure may be implemented as a software (S/W) program including instructions stored in a computer-readable storage medium.

The computer is a device capable of invoking stored instructions from the storage medium and operate according to an embodiment disclosed herein based on the invoked instructions, and may include an image transmission device and an image reception device according to the embodiments of the present disclosure.

The computer-readable storage medium may be provided in the form of a non-transitory storage medium. Here, the term 'non-transitory' simply means that the storage medium is a tangible device, and does not include a signal, but this term does not differentiate between where data is semi-permanently stored in the storage medium and where the data is temporarily stored in the storage medium.

In addition, an electronic device or a method according to the embodiments of the present disclosure may be provided in a computer program product. The computer program product may be traded between a seller and a purchaser as a commodity.

The computer program product may include a S/W program and a computer-readable recording medium storing the S/W program. For example, the computer program product may include a product in the form of a S/W program electronically distributed (e.g., a downloadable application) through a manufacturer of an electronic device or an electronic market (e.g., Google Play Store, App Store). For electronic distribution, at least part of the S/W program may be stored in a storage medium or temporarily generated. In this case, the storage medium may be a storage medium of a server of the manufacturer or a server of the electronic market, or a relay server that temporarily stores the S/W program.

In a system consisting of a server and a terminal (e.g., an electronic ranging device), the computer program product may include a storage medium of the server or a storage medium of the terminal. Alternatively, when there is a third device (e.g., a smart phone) communicatively connected to the server or the terminal, the computer program product may include a storage medium of the third device. Alternatively, the computer program product may include the S/W program itself transmitted from the server to the terminal or the third device, or transmitted from the third device to the terminal. In this case, one of the server, the terminal, and the third device may execute the computer program product to perform the method according to the embodiments disclosed herein. Alternatively, two or more of the server, the terminal, and the third device may execute the computer program product to execute the method according to the embodiments disclosed herein in a distributed manner.

For example, the server (e.g., a cloud server, an artificial intelligence server) may execute the computer program product stored in the server to control the terminal communicatively connected to the server to perform the method according to the embodiments disclosed herein.

As another example, the third device may execute the computer program product to control the terminal communicatively connected to the third device to perform the method according to the embodiments disclosed herein. As a detailed example, the third device may remotely control a ranging device to perform ranging.

When the third device executes the computer program product, the third device may download the computer program product from the server, and execute the downloaded computer program product. Alternatively, the third device may execute the computer program product provided in a preloaded state, and perform the method according to the embodiments disclosed herein.

The invention claimed is:

1. An operation method of a first electronic device for performing ranging through ultra-wideband (UWB), the operation method comprising:

transmitting, by the first electronic device, a first ranging control message (RCM) including information for controlling a ranging procedure of a ranging group, wherein the first RCM includes a first transmission offset for the ranging group, a ranging round information element (RR IE) including a second transmission offset configured for receiving a ranging request from a device not participating in the ranging group, and a first ranging device management information element (RDM IE) including information about a slot designated to receive the ranging request, and wherein an address for the slot designated to receive the ranging request is specified as 0xFFFF;

receiving the ranging request from a second electronic device not participating in the ranging group based on the second transmission offset and the information about the slot designated to receive the ranging request;

determining whether to accept for the second electronic device to participate in the ranging group based on the received ranging request;

in case of accepting for the second electronic device to participate in the ranging group, transmitting a second RCM including information about a slot allocated to the second electronic device, wherein the second RCM includes a second RDM IE including a slot allocated to each of devices of the ranging group and an address of each of the devices of the ranging group, and wherein the second RDM IE indicates an acknowledgement for the ranging request from the second electronic device, in case that the second RDM IE further includes an address of the second electronic device; and performing ranging with the second electronic device based on the second RCM.

2. The operation method of claim 1, wherein the performing of the ranging includes:

transmitting a first ranging frame to the second electronic device;

receiving a second ranging frame from the second electronic device;

calculating, based on the first ranging frame and the second ranging frame, a time period taken for the second ranging frame to be delivered from the second electronic device to the first electronic device; and calculating a distance between the first electronic device and the second electronic device based on the calculated time period.

3. An operation method of a second electronic device for performing ranging through ultra-wideband (UWB), the operation method comprising:

receiving a first ranging control message (RCM) from a first electronic device that controls a ranging procedure of a ranging group, wherein the first RCM includes a first transmission offset for the ranging group, a ranging round information element (RR IE) including a second transmission offset configured for receiving a ranging request from a device not participating in the ranging group, and a first ranging device management information element (RDM IE) including information about a slot designated to receive the ranging request, and wherein an address for the slot designated to receive the ranging request is specified as 0xFFFF;

transmitting the ranging request for participating in the ranging group to the first electronic device based on the second transmission offset and the information about the slot designated to receive the ranging request;

in case that the second electronic device is accepted for participating in the ranging group based on the ranging request, receiving a second RCM including information about a slot allocated to the second electronic device, wherein the second RCM includes a second RDM IE including a slot allocated to each of devices of the ranging group and an address of each of the devices of the ranging group, and wherein the second RDM IE indicates an acknowledgement for the ranging request, in case that the second RDM IE further includes an address of the second electronic device; and performing ranging with the ranging group based on the second RCM.

4. A first electronic device for performing ranging through ultra-wideband (UWB), the first electronic device comprising:

a communicator;

a memory; and at least one processor configured to execute a program stored in the memory to control an operation of the first electronic device, wherein the at least one processor is further configured to:

transmit a first ranging control message (RCM) including information for controlling a ranging procedure of a ranging group for the first electronic device, wherein the first RCM includes a first transmission offset for the ranging group, a ranging round information element (RR IE) including a second transmission offset configured for receiving a ranging request from a device not participating in the ranging group, and a first ranging device management information element (RDM IE) including information about a slot designated to receive the ranging request, and wherein an address for the slot designated to receive the ranging request is specified as 0xFFFF, receive the ranging request from a second electronic device not participating in the ranging group based on the second transmission offset and the information about the slot designated to receive the ranging request, determine whether to accept for the second electronic device to participate in the ranging group based on the received ranging request, in case of accepting for the second electronic device to participate in the ranging group, transmit a second RCM including information about a slot allocated to the second electronic device, wherein the second RCM includes a second RDM IE including a slot allocated to each of devices of the ranging group and an address of each of the devices of the ranging group, and wherein the second RDM IE indicates an acknowledgement for the ranging request from the second electronic device, in case that the second RDM IE further includes an address of the second electronic device, and perform ranging with the second electronic device based on the second RCM.

5. The first electronic device of claim 4, wherein the at least one processor is further configured to:

transmit a first ranging frame to the second electronic device, receive a second ranging frame from the second electronic device, calculate, based on the first ranging frame and the second ranging frame, a time period taken for the second ranging frame to be delivered from the second electronic device to the first electronic device, and calculate a distance between the first electronic device and the second electronic device based on the calculated time period.

\* \* \* \* \*